US012426144B2

(12) United States Patent
Guo et al.

(10) Patent No.: US 12,426,144 B2
(45) Date of Patent: Sep. 23, 2025

(54) BATHTUB LAMP DRIVEN BY WIRELESS POWER TRANSMISSION

(71) Applicant: Guangzhou Rising Dragon Recreation Industrial Co., Ltd., Guangzhou (CN)

(72) Inventors: Ziqin Guo, Guangzhou (CN); Bo Liang, Guangzhou (CN)

(73) Assignee: Guangzhou Rising Dragon Recreation Industrial Co., Ltd., Guangzhou (CN)

( * ) Notice: Subject to any disclaimer, the term of this patent is extended or adjusted under 35 U.S.C. 154(b) by 97 days.

(21) Appl. No.: 18/590,960

(22) Filed: Feb. 29, 2024

(65) Prior Publication Data

US 2025/0142705 A1 May 1, 2025

(30) Foreign Application Priority Data

Nov. 1, 2023 (CN) ........................ 202322946287.4

(51) Int. Cl.
*H05B 45/20* (2020.01)
*H05B 45/325* (2020.01)
*H05B 47/19* (2020.01)

(52) U.S. Cl.
CPC ............ *H05B 47/19* (2020.01); *H05B 45/20* (2020.01); *H05B 45/325* (2020.01)

(58) Field of Classification Search
CPC ........ H05B 45/10; H05B 45/20; H05B 45/30; H05B 45/325; H05B 47/10
See application file for complete search history.

(56) References Cited

U.S. PATENT DOCUMENTS

2014/0042933 A1* 2/2014 Livschitz .............. H05B 45/14 315/307

* cited by examiner

*Primary Examiner* — Jimmy T Vu
(74) *Attorney, Agent, or Firm* — Frank Niranjan

(57) ABSTRACT

The application provides a bathtub lamp driven by wireless power transmission, which comprises a lamp holder and a lamp body wirelessly connected with the lamp holder. An active level signal of a PWM signal generated by an LED controller to control a R-LED module/G-LED module/B-LED module is modulated with a high-frequency signal corresponding to a fixed frequency generator through a modulation amplifier in the lamp holder to generate a wireless power transmission signal and amplify the wireless power transmission signal for output, the wireless transmission of the wireless power transmission signal and electric energy is realized through the cooperation of a corresponding transmitting resonator and a receiving resonator in the lamp body; the corresponding PWM signals in the respective wireless power transmission signals are extracted by a detector circuit in the lamp body and output to drive the R-LED module/G-LED module/B-LED module for variable light-emitting operations.

8 Claims, 3 Drawing Sheets

BATHTUB LAMP DRIVEN BY WIRELESS POWER TRANSMISSION

TECHNICAL FIELD

The application relates to the technical field of wireless bathtub lamp control, in particular to a bathtub lamp driven by wireless power transmission.

BACKGROUND

Bathtub lamp is a kind of lighting device installed in the bathroom, which is usually used to provide soft ambient light and increase the comfort and visual effect of the bathroom. Because the bathtub lamp is used in the environment where it is often in contact with the water source, the wireless bathtub lamp has gradually become the mainstream of bathroom lamps in order to prevent the risk of electric leakage caused by the breakage of lamp wires.

The wireless bathtub lamp is divided into two parts: a lamp body and a lamp holder. A PWM signal is converted into a brightness signal through the lamp holder and then encoded, and then the encoded signal is modulated into a wireless power transmission signal to be wirelessly transmitted to the lamp body; the lamp body receives and decodes it to generate a PWM signal with a corresponding brightness to control the color change of the LED lamp. The implementation process of this kind of wireless bathtub lamp control is complicated, and the signal transmission and reception need encoding and decoding. As a result, the signal transmission speed of this kind of wireless lamps is slow, and the energy consumption of coded signals and LEDs is not synchronous during signal transmission, resulting in the decrease of the maximum power of wireless power transmission.

SUMMARY

In view of the technical problems in the prior art that the wireless bathtub lamp is responsible for the control process, the signal transmission speed is slow, and the wireless power transmission is low, the application provides a bathtub lamp driven by wireless power transmission.

A bathtub lamp driven by wireless power transmission, comprising a lamp holder and a lamp body wirelessly connected with the lamp holder, wherein the lamp holder comprises a lamp holder body, in which an LED controller, a fixed frequency generator, three modulation amplifiers and three transmitting resonators are arranged; the modulation amplifiers are respectively electrically connected with the LED controller and the fixed frequency generator; and the modulation amplifiers are respectively electrically connected with the transmitting resonators in one-to-one correspondence;

the lamp body is provided with a Red Light-Emitting Diode module (R-LED module), a Green Light-Emitting Diode module (G-LED module), a Blue Light-Emitting Diode module (B-LED module) and three receiving resonators corresponding to the transmitting resonators one by one, and the R-LED module, the G-LED module and the B-LED module are electrically connected to the receiving resonators one by one respectively; and a detector circuit is respectively arranged between the R-LED module/G-LED module/B-LED module and the receiving resonator electrically connected therewith;

the LED controller is configured for respectively generating PWM signals for controlling the R-LED module, the G-LED module and the B-LED module;

the fixed frequency generator is configured for generating a high-frequency signal with a fixed frequency;

the modulation amplifiers are respectively configured for integrating active level signals of the PWM signals controlling the R-LED module/G-LED module/B-LED module into the high-frequency signal to form a wireless power transmission signal, which is amplified and then transmitted to the corresponding receiving resonator through the transmitting resonator;

the receiving resonator forms an electric energy output to supply power to the lamp body after receiving the wireless power transmission signal; and the detector circuit extracts the PWM signal from the wireless power transmission signal and outputs the PWM signal to drive the R-LED/G-LED/B-LED to change a light emission operation.

Preferably, wherein the fixed frequency generator is an oscillator, and the oscillator is electrically connected with the three modulation amplifiers respectively.

Preferably, wherein a MOS tube is arranged between the transmitting resonator and the corresponding modulation amplifier thereof, and on-off of the MOS tube is controlled by the presence or absence of the wireless power transmission signal.

Preferably, wherein the transmitting resonator comprises a transmitting resonance coil and a capacitor C1 connected in parallel with the transmitting resonance coil, and the receiving resonator comprises a receiving resonance coil and a capacitor C2 connected in parallel with the receiving resonance coil.

Preferably, wherein each detector circuit comprises a rectifier circuit and a filter circuit.

Preferably, wherein the rectifier circuit comprises a diode, and the filter circuit consists of a receiving resonance coil electrically connected to the detector circuit correspondingly and a capacitor C3.

Preferably, wherein the lamp holder is further provided with a power supply module, and the power supply module is electrically connected with the LED controller and the fixed frequency generator respectively.

Preferably, wherein an outer side of the lamp holder body is provided with external threads, and the lamp holder body is fixed on a reserved installation hole of a bathtub through a locking sleeve.

The application has the following beneficial effects that: the application provides a bathtub lamp driven by wireless power transmission, which comprises a lamp holder and a lamp body wirelessly connected with the lamp holder; an active level signal of a PWM signal generated by an LED controller to control a R-LED module/G-LED module/B-LED module is modulated with a high-frequency signal corresponding to a fixed frequency generator through a modulation amplifier in the lamp holder to generate a wireless power transmission signal and amplify the wireless power transmission signal for output, so that the wireless transmission of the wireless power transmission signal and electric energy is realized through the cooperation of a corresponding transmitting resonator and a receiving resonator in the lamp body; at the same time, the corresponding PWM signals in the respective wireless power transmission signals are extracted by a detector circuit in the lamp body and output to drive the R-LED module/G-LED module/B-LED module for variable light-emitting operations, thus realizing the synchronization of the energy consumption of the PWM signals and the LED module, improving the wireless power transmission, and the LED is driven at a constant current by using the impedance of a wireless power transmission coil, which is beneficial to improving the energy utilization rate.

REFERENCE SIGNS

1. Lamp holder; 2. Lamp body; 3. LED controller; 4. Fixed frequency generator; 41. Oscillator; 5. Modulation amplifier; 6. Transmitting resonator; 7. R-LED module; 8. G-LED module; 9. B-LED module; 10. Receiving resonator; 11. Detector circuit; 111, Rectifier circuit; 12. MOS tube.

DESCRIPTION OF EMBODIMENTS

In order to further introduce the application in detail, the following description will be made with the attached drawings. It is particularly pointed out that the embodiments described below are only part, rather than all of the embodiments of the application. Based on the embodiments in this utility model, all other embodiments obtained by those skilled in the art without creative work belong to the protection scope of this utility model.

Figure 1:
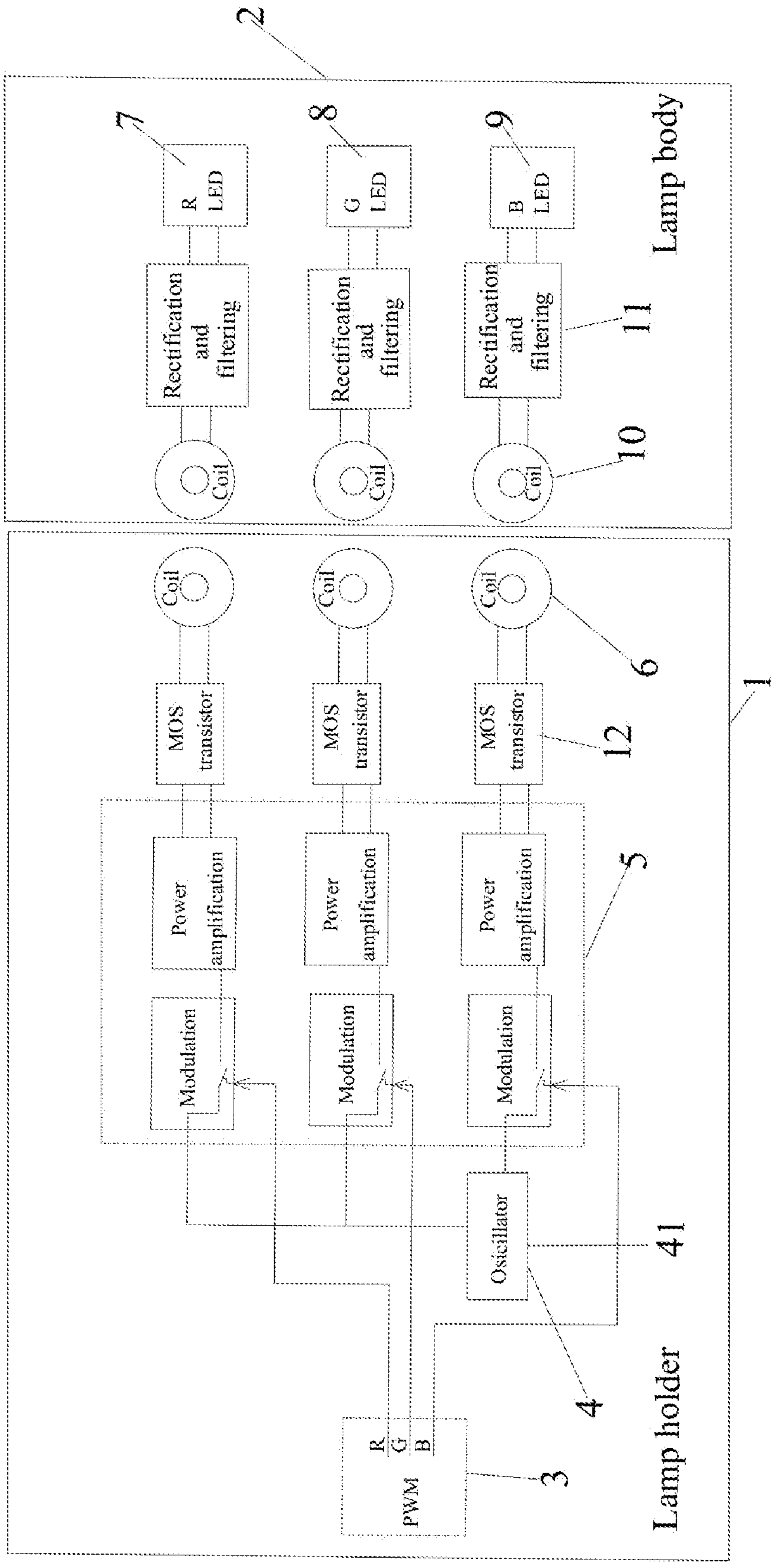
FIG. 1 is a brief schematic diagram of the lamp body structure of a bathtub lamp driven by wireless power transmission provided by the application.
Figure 2:
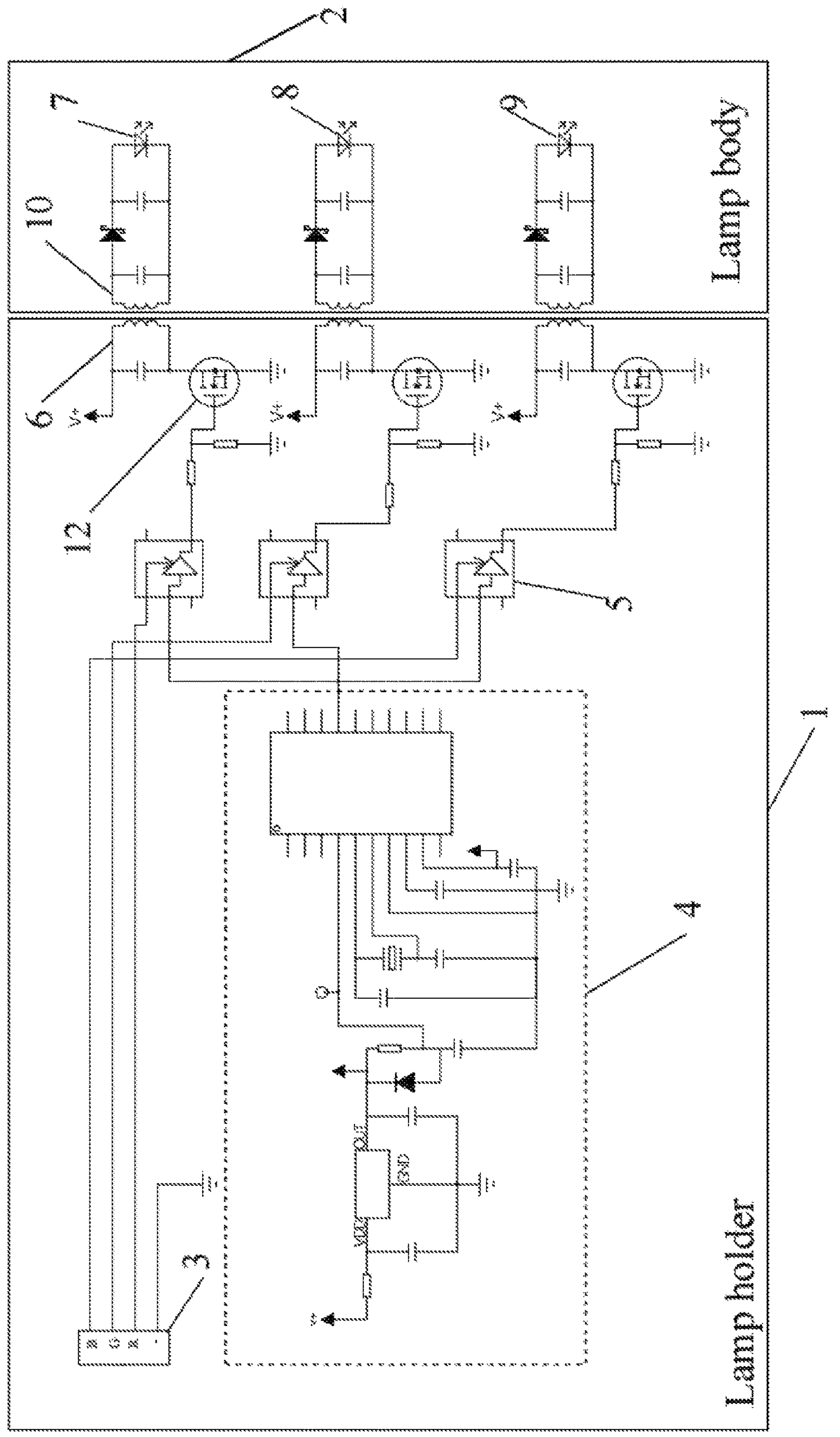
FIG. 2 is a schematic circuit diagram of a bathtub lamp driven by wireless power transmission provided by the application.
Figure 3:
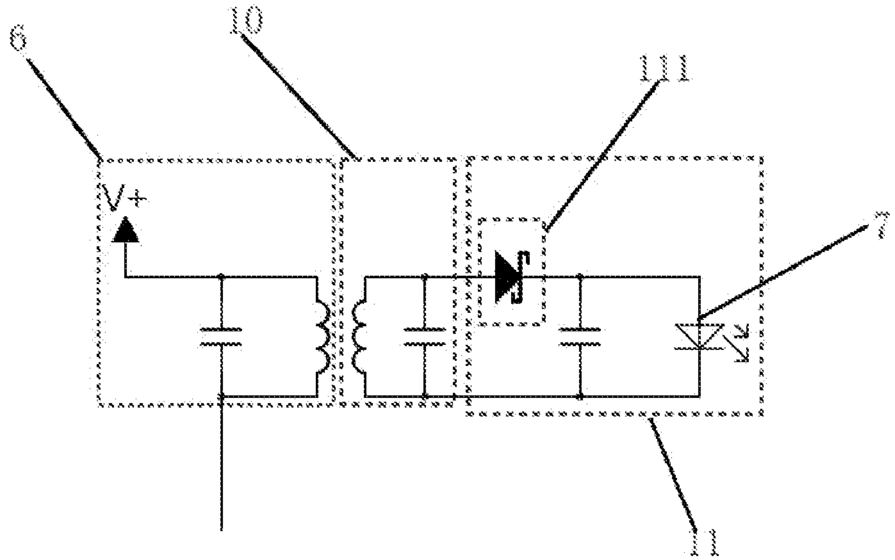
FIG. 3 is a schematic circuit diagram of the transmitting resonator, the detector circuit and the R-LED module provided by the application.

Referring to FIGS. 1 and 2, a bathtub lamp driven by wireless power transmission includes a lamp holder 1 and a lamp body 2 wirelessly connected with the lamp holder 1.

Specifically, the lamp holder 1 includes a lamp holder body (not shown in the figure), and the outer side of the lamp holder body is provided with external threads (not shown in the figure). The lamp holder body is fixed on a reserved installation hole (not shown in the figure) of a bathtub through a locking sleeve (not shown in the figure).

An LED controller 3, a fixed frequency generator 4, three modulation amplifiers 5 and three transmitting resonators 6 are arranged in the lamp holder body; the modulation amplifier 5 is electrically connected with the LED controller 3 and the fixed frequency 4 generator respectively; and the modulation amplifiers 5 are electrically connected with the transmitting resonators 6 in one-to-one correspondence.

The lamp body 2 is internally provided with an R-LED module 7, a G-LED module 8, a B-LED module 9 and three receiving resonators 10 corresponding to the transmitting resonator 6 one by one, and the R-LED module 7, the G-LED module 8 and the B-LED module 9 are respectively electrically connected to the receiving resonators 10 one by one; and a detector circuit 11 is respectively arranged between the R-LED module/G-LED module/B-LED module and the receiving resonator 10 electrically connected therewith.

Wherein, the LED controller 3 is used to generate PWM signals for controlling the R-LED module 7, the G-LED module 8 and the B-LED module 9, respectively; the LED controller 3 will generate corresponding PWM signals according to the brightness requirements and color display effect requirements of the R-LED module 7, the G-LED module 8 and the B-LED module 9 input by the user, and the brightness of each LED module and the display effect of various colors can be adjusted by adjusting the duty ratio of the PWM signals.

The fixed frequency generator 4 is used to generate a high-frequency signal with a fixed frequency. Preferably, the fixed frequency generator 4 is an oscillator 41, which is electrically connected with three modulation amplifiers 5 respectively. The oscillator 41 generates a high-frequency signal with a fixed frequency according to a preset demand and transmits it to the corresponding modulation amplifier 5 for further processing.

The modulation amplifier 5 is used to respectively integrate the active level signals of PWM signals controlling the R-LED module 7, the G-LED module 8 and the B-LED module 9 into corresponding high-frequency signals, and form a wireless power transmission signal, which is amplified and then sent out through the transmitting resonator 6. The receiving resonator 10 forms electric energy after receiving the wireless power transmission signal, and outputs the electric energy to the detector circuit 11, an R-LED module 7, a G-LED module 8 and a B-LED module 9 for power supply. The detector circuit 11 extracts the PWM signal from the wireless power transmission signal and outputs it to drive the R-LED module 7, the G-LED module 8 and the B-LED module 9 for variable light-emitting operations.

Preferably, the process of the LED controller controlling the generation of PWM signals, the fixed frequency generator 4 controlling the generation of high-frequency signals, and the modulation amplifier 5 modulating the PWM signals and high-frequency signals into a wireless power transmission signal can be realized internally through a MCU programming, which is beneficial to simplifying the lamp structure and circuit complexity and flexibly adjusting the frequency and duty ratio of PWM signals.

A MOS tube 12 is arranged between the transmitting resonator 6 and the modulation amplifier 10, and the on-off of the MOS tube 12 is controlled by the presence or absence of the wireless power transmission signal. When the wireless power transmission signal exists, the MOS tube 12 is turned on, allowing the signal to pass through, and making the transmitting resonator 6 and the modulation amplifier 10 work normally. When the wireless power transmission signal does not exist, the MOS tube 12 is turned off, blocking the signal transmission, thereby stopping the operation of the transmitting resonator 6 and the modulation amplifier 10. This control mode can be used to adjust the power output of the system and realize effective energy transmission and energy saving.

Wherein, the active level signal of the PWM signal refers to the part of a PWM control signal used to control the work of the lamp. Usually, the PWM control signal of common cathode lamps is effective at a high level, that is, when the PWM signal is at a high level, the common cathode lamps will be activated; the PWM control signal of a common anode is effective at a low level, that is, when the PWM signal is at a low level, the common anode lamp will be activated. Therefore, when the PWM signal is at an active level, the corresponding high-frequency signal thereof is allowed to pass through the modulation amplifier 5 to form a wireless power transmission signal, so as to realize the effective part of the PWM signal cycle, that is, when the PWM signal is at an active level, the wireless power transmission signal can be generated, so as to cooperate with the receiving resonator 10 to generate an alternating electric field and realize the wireless transmission of electric energy; when the PWM signal is at an inactive level, the corresponding high-frequency signal cannot pass through the modulation amplifier 5, and no wireless signal is output; in the inactive part of the PWM cycle, that is, at the inactive level, no wireless power transmission signal is generated, therefore it is impossible to generate an alternating electric field in cooperation with the receiving resonator 10. Finally, a modulated wireless power transmission signal with a duration synchronized with the active level of the PWM signal is formed and transmitted after further amplification.

The transmitting resonator 6 receives the wireless power transmission signal and generates an electric energy electromagnetic field and a signal electromagnetic field with fixed frequencies; the receiving resonator 10 uses the characteristics of near-field transmission to receive the electric energy electromagnetic field with a fixed frequency and convert it into electric energy, which is then output to the R-LED module 7, G-LED module 8 or B-LED module 9 electrically connected to the corresponding receiving resonator 11 for power supply after rectification and filtering. The receiving resonator 10 also uses the characteristics of near-field transmission to receive the signal electromagnetic field with a fixed frequency and convert it into signal electric energy, and extracts the PWM signal in the wireless power transmission signal carried in the signal electric energy through the detector circuit 11 and outputs it to the corresponding R-LED module 7, G-LED module 8 or B-LED module 9 to control the brightness and color of the R-LED module 7, G-LED module 8 or B-LED module 9.

Wherein, the transmitting resonator 6 includes a transmitting resonance coil and a capacitor C1 connected in parallel with the transmitting resonance coil, and the receiving resonator 10 includes a receiving resonance coil and a capacitor C2 connected in parallel with the receiving resonance coil. The detector circuit 11 includes a rectifier circuit 111 and a filter circuit 112.

Preferably, the rectifier circuit includes a diode, and the filter circuit consists of the receiving resonance coil and a capacitor C3.

A power supply module is also arranged in the lamp holder 1, and the power supply module is electrically connected with the LED controller 3 and the fixed frequency generator 4 respectively to supply power to the lamp holder 1.

This application provides a bathtub lamp driven by wireless power transmission. The active level signal of the PWM signal generated by the LED controller 3 to control the R-LED module 7, G-LED module 8 or B-LED module is modulated with the high-frequency signal corresponding to fixed frequency generator 4 by the modulation amplifier 5 to generate a wireless power transmission signal, which is then output after amplification, so that the wireless transmission of the wireless power transmission signal and electric energy can be realized through the cooperation of corresponding transmitting resonator 6 and receiving resonator 10; at the same time, the corresponding PWM signals in the respective wireless power transmission signals are extracted by the detector circuit 11 and output to drive the R-LED module 7, the G-LED module 8 or the B-LED module 9 for variable light-emitting operations. Compared with the existing method of controlling the color change of LED lamps by transmitting brightness coded signals, decoding after receiving them and generating PWM signals with corresponding brightness, there is no need for coding and decoding, and the synchronization energy consumption of the PWM signal and the LED module is realized, thereby realizing the maximum power transmission of wireless power transmission. The constant current driving of the LED is realized by using the impedance of the wireless power transmission coil, which saves LED driving and improves the utilization rate of electric energy.

The embodiments disclosed above are only intended to illustrate the application in detail, and cannot be used to limit the scope of the application. Therefore, simple improvements and changes according to the scope of the application claims still belong to the scope of the application protection.

The protection scope of the application shall be subject to the defined scope. For those skilled in the art, several improvements and embellishments can be made without departing from the spirit and scope of the application, and these improvements and embellishments shall also be regarded as the protection scope of the application.

What is claimed is:

1. A bathtub lamp driven by wireless power transmission, comprising a lamp holder and a lamp body wirelessly connected with the lamp holder, wherein the lamp holder comprises a lamp holder body, in which an LED controller, a fixed frequency generator, three modulation amplifiers and three transmitting resonators are arranged; the modulation amplifiers are respectively electrically connected with the LED controller and the fixed frequency generator; and the modulation amplifiers are respectively electrically connected with the transmitting resonators in one-to-one correspondence;

the lamp body is provided with an R-LED module, a G-LED module, a B-LED module and three receiving resonators corresponding to the transmitting resonators one by one, and the R-LED module, the G-LED module and the B-LED module are electrically connected to the receiving resonators one by one respectively; and a detector circuit is respectively arranged between the R-LED module/G-LED module/B-LED module and the receiving resonator electrically connected therewith;

the LED controller is configured for respectively generating PWM signals for controlling the R-LED module, the G-LED module and the B-LED module;

the fixed frequency generator is configured for generating a high-frequency signal with a fixed frequency;

the modulation amplifiers are respectively configured for integrating active level signals of the PWM signals controlling the R-LED module/G-LED module/B-LED module into the high-frequency signal to form a wireless power transmission signal, which is amplified and then transmitted to the corresponding receiving resonator through the transmitting resonator;

the receiving resonator forms an electric energy output to supply power to the lamp body after receiving the wireless power transmission signal; and the detector circuit extracts the PWM signal from the wireless power transmission signal and outputs the PWM signal to drive the R-LED/G-LED/B-LED to change a light emission operation.

2. The bathtub lamp driven by wireless power transmission according to claim 1, wherein the fixed frequency generator is an oscillator, and the oscillator is electrically connected with the three modulation amplifiers respectively.

3. The bathtub lamp driven by wireless power transmission according to claim 1, wherein a MOS tube is arranged between the transmitting resonator and the corresponding modulation amplifier thereof, and on-off of the MOS tube is controlled by the presence or absence of the wireless power transmission signal.

4. The bathtub lamp driven by wireless power transmission according to claim 1, wherein the transmitting resonator comprises a transmitting resonance coil and a capacitor C1 connected in parallel with the transmitting resonance coil, and the receiving resonator comprises a receiving resonance coil and a capacitor C2 connected in parallel with the receiving resonance coil.

5. The bathtub lamp driven by wireless power transmission according to claim 4, wherein each detector circuit comprises a rectifier circuit and a filter circuit.

6. The bathtub lamp driven by wireless power transmission according to claim 5, wherein the rectifier circuit comprises a diode, and the filter circuit consists of a receiving resonance coil electrically connected to the detector circuit correspondingly and a capacitor C3.

7. The bathtub lamp driven by wireless power transmission according to claim 1, wherein the lamp holder is further provided with a power supply module, and the power supply module is electrically connected with the LED controller and the fixed frequency generator respectively.

8. The bathtub lamp driven by wireless power transmission according to claim 1, wherein an outer side of the lamp holder body is provided with external threads, and the lamp holder body is fixed on a reserved installation hole of a bathtub through a locking sleeve.

* * * * *